Jan. 16, 1951 J. M. SALWIN 2,538,214
ENGINE MOUNTING FOR AUTOMOBILES
Filed May 31, 1947 2 Sheets-Sheet 1

INVENTOR.
JOHN M. SALWIN
BY
Toulmin & Toulmin
ATTORNEYS

Jan. 16, 1951　　　J. M. SALWIN　　　2,538,214
ENGINE MOUNTING FOR AUTOMOBILES
Filed May 31, 1947　　　　　　　　　　　　2 Sheets-Sheet 2

INVENTOR.
JOHN M. SALWIN
BY
Toulmin & Toulmin
ATTORNEYS

Patented Jan. 16, 1951

2,538,214

UNITED STATES PATENT OFFICE 2,538,214

ENGINE MOUNTING FOR AUTOMOBILES

John M. Salwin, Detroit, Mich., assignor to Tucker Corporation, Chicago, Ill., a corporation of Delaware Application May 31, 1947, Serial No. 751,582

5 Claims. (Cl. 180—73)

The present invention relates to the mounting of an engine in a motor vehicle, and is concerned primarily with an arrangement designed to mount a motor at the rear of an automobile.

In accordance with certain recent trends in automotive engineering, it has been proposed to locate an engine at the rear of an automobile. Such an arrangement affords certain advantages, such as eliminating extensive driving connections, and is one which it is believed will meet with public acceptance.

An automobile ordinarily includes a chassis which embodies as essential elements a pair of spaced side bars such as channel bars. The present invention has as its foremost objective the provision of structural devices designed to mount the engine between these side bars of the chassis at the rear of a car.

In locating an engine at the rear of an automobile, it becomes necessary to accommodate such elements as the transmission and the universal driving connection which extends from the transmission to the rear driving wheels. Thus, a further object of the invention is to provide, in an automobile, an engine mounting which not only adequately supports the engine, but also makes provision for supporting the transmission with the engine in the space between the side bars of the chassis.

A further, more detailed object of the invention is to provide an engine mounting which consists essentially of a pair of hangers, each of which is designed to be suspended from a chassis side bar. Each of these hangers includes anchor portions that are offset from the main body part and which are connected thereto by inclined straps. The main body parts of the respective hangers carry therebetween the engine, while a transmission is anchored to the outer face of each of these body parts.

Another highly important object of the invention is to provide a novel method of suspending an engine from a vehicle chassis. More particularly, the invention has in mind a novel method of suspending an engine at the rear of the vehicle chassis in a transverse position; that is, with its crankshaft extending crosswise of the chassis.

A corollary objective is to provide a method of assembling the engine together with a transmission at each end thereof from the same hangers.

Various other more detailed objects and advantages of the invention such as arise in connection with carrying out the above noted ideas in a practical embodiment, will in part become apparent and in part be hereinafter stated as the description of the invention proceeds.

The invention, therefore, comprises an engine mounting for mounting the engine of an automobile at the rear of the chassis and in the space between the side bars of the chassis in such a position as to leave sufficient room at each side for the transmission. The engine mounting consists essentially of hanger elements that are suspended from the chassis side bars. The method of suspending the engine and transmission from common hangers is an important part of the invention.

For a full and more complete understanding of the invention, reference may be had to the following description and accompanying drawings, wherein:

Figure 4 is a top plan view, with the body of the automobile removed, showing the engine mounted between the chassis side bars.

Figure 1:
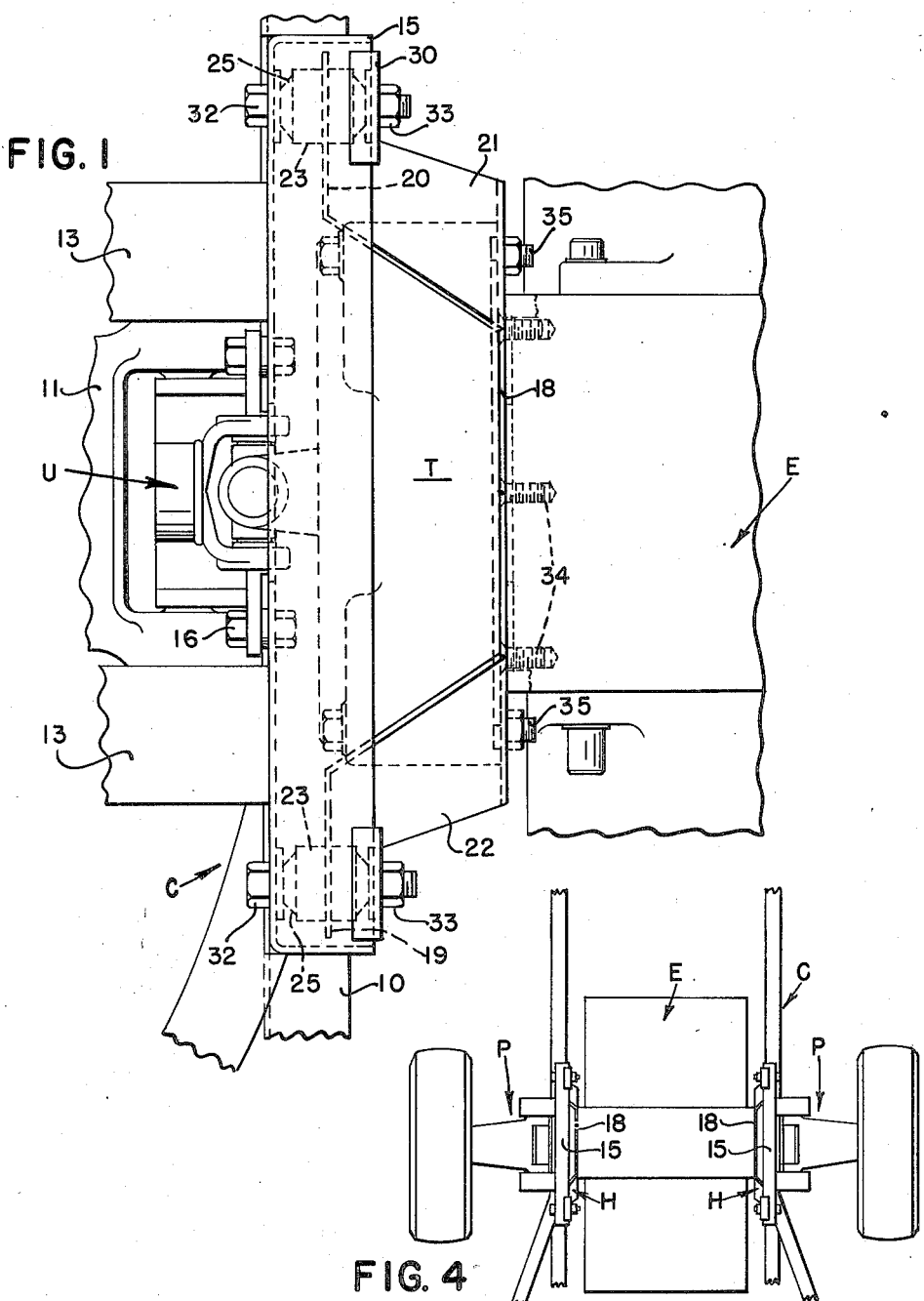
Figure 1 is a fragmentary top plan view of one side of a motor vehicle having an engine mounted thereon in accordance with the precepts of this invention.
Figure 2:
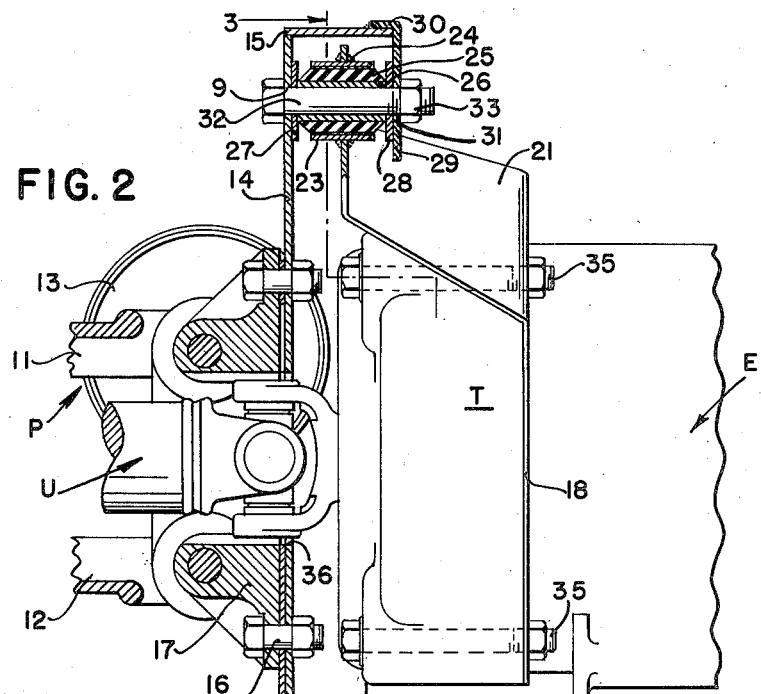
Figure 2 is a side view with the chassis and associated parts shown in section and the engine and the mounting in elevation.
Figure 3:
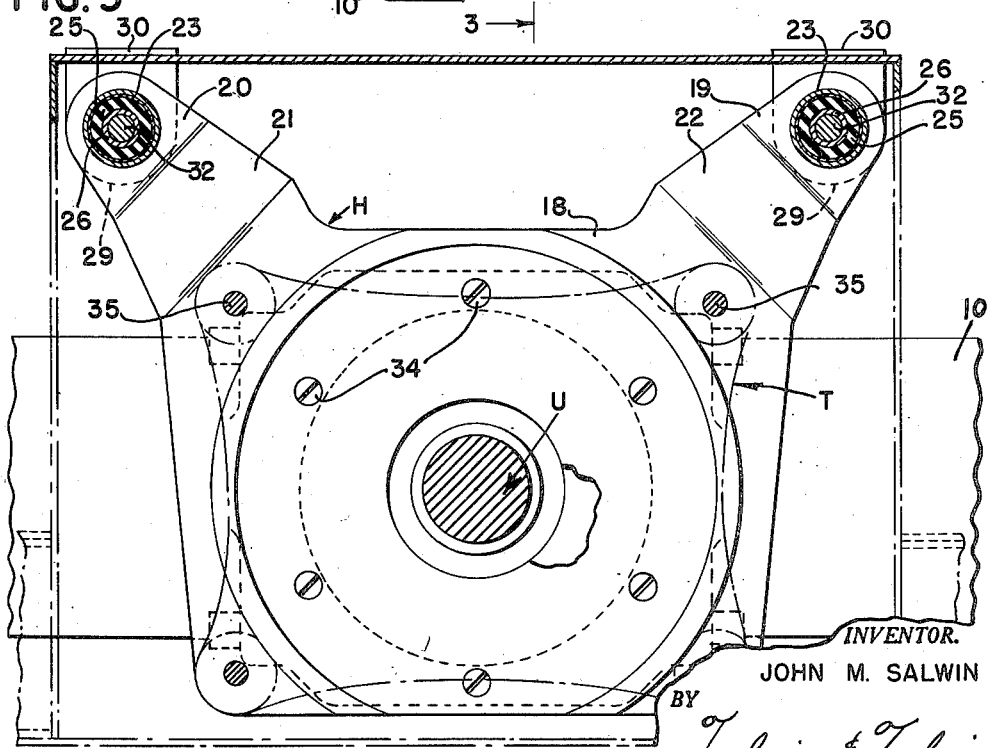
Figure 3 is a section taken longitudinally of the automobile and about on the planes represented by the lines 3—3 of Figure 2.

Referring now to the drawings wherein like reference characters denote corresponding parts, and first more particularly to Figure 1, a chassis of an automobile is identified in its entirety by the reference character C and is shown as including side bars 10 which preferably are of a channel construction, with the channels opening inwardly of the car. Anchored to the outside of each chassis is a parallelogram suspension referred to generally as P, and which includes an upper suspension arm 11 and a lower arm 12, both of which are pivotally mounted on the side bar 10. A torsion spring shown at 13 is associated with the pivotal mounting of the arm 11.

Secured to each channel member 10 is a channel-shaped bracket 14 having a top flange 15. This bracket 14 is anchored to the side bar 10 by bolts 16, which also may be used in anchoring the pivot bases 17 for the suspension arms 11 and 12 on the opposite face of the channel member 10.

A hanger is referred to in its entirety by the reference character H. This hanger comprises a main body or plate portion 18 and offset ears 19 and 20 which are connected to the main body portion 18 by inclined strap portions 21 and 22. Each of the ears 19 and 20 is suspended from the bracket 14 in a manner now to be described.

Each of the ears 19 and 20 is formed with an opening that is lined by a sleeve 23, this sleeve preferably being welded to the ear as indicated at 24. A rubber collar 25 is positioned within the sleeve 23 and is carried on a spool-like member 26. The latter has end flanges 27 and 28.

The end flange 27 abuts the bracket 14, and the bore of the spool 26 is in alignment with an opening 9 in the bracket. A tab 29 has an overhanging top flange 30 which is secured to the flange 15 as by welding. This tab 29 is formed with an opening 31 which also aligns with the bore of the spool 26. A headed bolt 32 extends through the aligned openings 9 and 31 and the bore of the spool 26. A nut 33 serves to maintain the bolt in position.

The engine is represented diagrammatically at E, while a transmission is shown at T. It is evident that the engine E is positioned between the two hangers H, and may be secured to the inner faces of the main body plates 18 by the screw fastening members shown at 34. The transmission T is anchored to the outer face of each plate 18 by bolts shown at 35.

A universal driving connection is depicted at U and is shown as extending outwardly from the transmission T through an opening 36 in the bracket 14, and thence between the suspension arms 11 and 12.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an automobile and in combination, a chassis including a pair of spaced side channel bars, an engine at the rear of said automobile between said side bars and having its ends spaced therefrom, a transmission at each end of said engine, a pair of hangers, each of which is connected on one face to said engine and carries on the other face one of said transmissions, a bracket for suspending each hanger from the respective chassis side bar a wheel suspension pivotally connected to each bracket and extending outward therefrom, a wheel carried by each suspension, and flexible drive shafts connecting the respective wheels and transmissions.

2. In an automobile and in combination, a chassis including a pair of spaced side bars, a bracket upstanding from each side bar, a hanger suspended from each bracket, said hanger including a main body plate and a suspension ear offset upwardly and outwardly therefrom, said suspension ear being connected to the upper part of said bracket, and an engine connected to and supported between the inner faces of said main body plates of said hangers.

3. In an automobile and in combination, a chassis including a pair of spaced side bars, a bracket upstanding from each side bar, a hanger suspended from each bracket, said hanger including a main body plate and a suspension ear offset upwardly and outwardly therefrom, said suspension ear being connected to the upper part of said bracket, an engine connected to and supported between the inner faces of said main body plates, and a transmission connected at the outer face of each of said main body plates.

4. In an automobile and in combination, a chassis, a pair of spaced supporting brackets extending upward from the chassis, an engine lying between the supporting brackets, and a mounting member connecting each supporting bracket to the engine, each mounting member being formed of sheet metal with a main body plate fitting over and secured to the engine, a pair of upwardly extending ears spaced horizontally, and integral horizontally inclined portions connecting the ears to the body plate, and means connecting the ears to the brackets, the ears forming the sole support for the mounting members.

5. In an automobile and in combination, a chassis, a pair of spaced supporting brackets extending upward from the chassis, an engine lying between the supporting brackets, and a mounting member connecting each supporting bracket to the engine, each mounting member being formed of sheet metal with a main body plate fitting over and secured to the engine, a pair of upwardly extending ears spaced horizontally, and integral horizontally inclined portions connecting the ears to the body plate, pins carried by the brackets, sleeves carried by the ears fitting over the pins, and resilient sleeves between the pins and the first named sleeves through which the mounting members are supported.

JOHN M. SALWIN.

REFERENCES CITED

The following references are of record in the file of this patent:

UNITED STATES PATENTS

| Number | Name | Date |
|---|---|---|
| 1,303,391 | Reich | May 13, 1919 |
| 1,494,121 | Lake | May 13, 1924 |
| 1,756,913 | Schjolin | Apr. 29, 1930 |
| 1,949,064 | Nathan | Feb. 27, 1934 |
| 2,066,530 | Hoffman | Jan. 5, 1937 |
| 2,129,124 | Geyer | Sept. 6, 1938 |
| 2,310,513 | Burns | Feb. 9, 1943 |

FOREIGN PATENTS

| Number | Country | Date |
|---|---|---|
| 502,496 | Germany | July 11, 1930 |
| 486,333 | Great Britain | June 2, 1938 |